United States Patent
Thibaut

(10) Patent No.: US 7,323,505 B2
(45) Date of Patent: Jan. 29, 2008

(54) AQUEOUS DISPERSIONS FOR ANTIOXIDANTS

(75) Inventor: Daniel Thibaut, Blotzheim (FR)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 0 days.

(21) Appl. No.: 11/387,358

(22) Filed: Mar. 23, 2006

(65) Prior Publication Data

US 2006/0167152 A1 Jul. 27, 2006

Related U.S. Application Data

(63) Continuation of application No. 10/508,443, filed as application No. PCT/EP03/02619 on Mar. 13, 2003, now Pat. No. 7,205,350.

(30) Foreign Application Priority Data

Mar. 21, 2002 (EP) .................. 02405218

(51) Int. Cl.
*C08K 5/105* (2006.01)
*C08L 29/04* (2006.01)
(52) U.S. Cl. ...................... 524/291; 524/503
(58) Field of Classification Search ............... 524/291, 524/503
See application file for complete search history.

(56) References Cited

U.S. PATENT DOCUMENTS

| 6,277,910 B1 | 8/2001 | Rassing et al. | 524/501 |
| 6,677,409 B2 | 1/2004 | Saito et al. | 526/84 |
| 2001/0022965 A1 | 9/2001 | Heger et al. | 424/59 |
| 2003/0073768 A1 | 4/2003 | Koch et al. | 524/323 |

FOREIGN PATENT DOCUMENTS

| EP | 0281210 | 9/1988 |
| EP | 0458509 | 11/1991 |
| EP | 0884352 | 12/1998 |
| EP | 1043340 | 10/2000 |
| EP | 1085069 | 3/2001 |
| GB | 1366702 | 9/1974 |
| JP | 11-349940 | 12/1999 |

OTHER PUBLICATIONS

Chem. Abstract 132:50692 for JP 11349940, Dec. 21, 1999.
Gohsenol: Customer information by Nippon Gosei, published Oct. 2000, pp. 1-31.

*Primary Examiner*—Kriellion A Sanders
(74) *Attorney, Agent, or Firm*—Tyler A. Stevenson

(57) ABSTRACT

The present invention relates to aqueous dispersions for solid phenolic antioxidants, wherein the antioxidants are dispersed in the aqueous phase with polyvinyl alcohol as dispersing agent. The invention also relates to a process, which comprises stabilising a polymer material against oxidative, thermal or light-induced degradation by adding to the polymer the aqueous dispersion.

5 Claims, No Drawings

AQUEOUS DISPERSIONS FOR ANTIOXIDANTS

This is a continuation of application Ser. No. 10/508,443, filed Sep. 16, 2004, now U.S. Pat. No. 7,205,350, which is a national stage application of PCT/EP03/02619, filed Mar. 13, 2003, the contents of which applications are incorporated by reference.

The present invention relates to aqueous dispersions for solid phenolic antioxidants, a process for preparing the aqueous dispersions, the further processing of the aqueous dispersion and a polymer composition comprising the dispersed components of the aqueous dispersion. The invention particularly relates to storage-stable, non-sedimenting emulsions comprising phenolic antioxidants, for example for use for stabilising emulsion-polymerised polymers and copolymers against atmospheric oxidative reactions.

Solid additives, such as certain commercial phenolic antioxidants from the Irganox® (trade mark of Ciba Specialty Chemicals) series, e.g. IRGANOX 1076: Octadecyl-3-(3,5-di-tert-butyl-4-hydroxyphenyl)-propionate, are used for a great variety of technical applications, e.g. for the stabilisation of polymers against oxidative, thermal or light induced degradation. A small particle size is preferred to assure the efficiency of the additive used. The ideal particle size should be mainly in the range from 0.1 to 10.0 μ. Any particle size smaller than 5.0 μ is particularly preferred.

Wet grinding, as opposed to grinding of dry particles, is a standard method for obtaining particles of this small size. This method combines the advantages of a reduction to small particles with the preparation of a dispersion comprising the particles in an inert liquid. Such dispersions are preferably prepared from solids by grinding within deionised water as the dispersant phase and require the presence and/or subsequent addition of various additives, such as surfactants, thickeners, and fungicides, to ensure the mechanical and chemical stabilisation of the dispersion. The solids are prepared by work-up methods, such as crystallisation, filtration, drying or grinding, in a sequential step subsequent to their synthesis. The present invention intends to replace the wet grinding step with a more convenient and feasible step for reducing the particle size.

It has surprisingly been found that converting phenolic antioxidants to an aqueous dispersion, particularly to an emulsion, reduces the particle size of solid phenolic antioxidants even further to the size of small droplets. It has not been known before that a melt prepared from solid material of phenolic antioxidants of the formula (I) is dispersible as an emulsion in an aqueous phase wherein the non-ionic surfactant polyvinyl alcohol is dispersed. The preparation of a molten phase and its subsequent dispersion to give an emulsion is clearly more beneficial than the standard method of isolating a solid, e.g. by crystallisation, and its subsequent wet grinding.

The present invention relates to an aqueous dispersion comprising a) A compound of the formula:

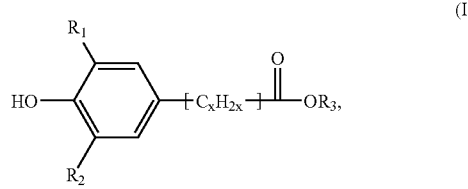

(I)

Wherein
One of $R_1$ and $R_2$ independently of one another represents hydrogen or $C_1$-$C_4$alkyl and the other one represents $C_3$-$C_4$alkyl;
x represents zero (direct bond) or a numeral from one to three; and
$R_3$ represents $C_8$-$C_{22}$alkyl; or groups of the partial formulae

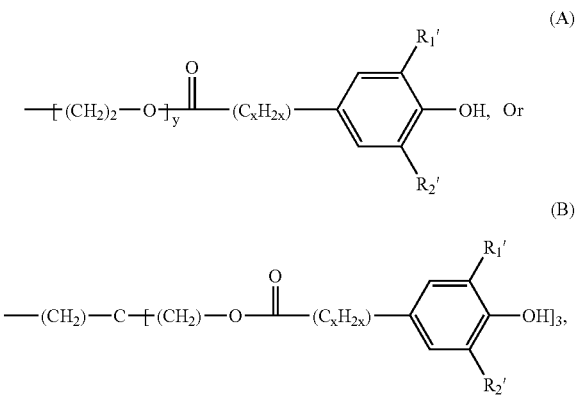

Wherein
One of $R_1'$ and $R_2'$ independently of one another represents hydrogen or $C_1$-$C_4$alkyl and the other one represents $C_3$-$C_4$alkyl;
x represents zero (direct bond) or a numeral from one to three; and
y represents a numeral from two to six;

b) Polyvinyl alcohol having a degree of polymerisation of about 500-2 500 and a degree of hydrolysis of about 70.0-99.9%; and, optionally, further additives; and c) Water.

The general terms used in the description of the instant invention, unless defined otherwise, are defined as follows:

The term aqueous dispersion comprises any mixture of two phases wherein dispersed particles are distributed homogeneously in a dispersant phase (dispergens), which in the instant case is water.

The term aqueous dispersion is defined within the limits of so-called solid/liquid or liquid/liquid disperse systems, e.g. emulsion, dispersion, as opposed to other types of dispersions, such as solid/gas, e.g. fumes, or gas/liquid, e.g. foams, dispersions. Solid/liquid dispersions that apply here consist of a two-phase system containing insoluble solid particles or solid particles of low solubility within a liquid. Liquid/liquid dispersions are commonly defined as emulsions and consist of two separate phases of different polarity. In the instant case a non-polar phase is dispersed in the polar phase, which is water.

The term dispersed particles comprises solid and, in particular, liquid particles, in the instant case the compound of the formula (I), to be distributed homogeneously within a liquid phase, e.g. water. Homogeneous distribution means that the concentration of the solid or liquid particles within the liquid dispersion agent is identical or approximately identical in any volume fraction of that liquid phase (even distribution of liquid or solid particles).

Component a)

In a compound of the formula (I) $R_1$ and $R_2$ defined as $C_1$-$C_4$alkyl comprise the unbranched and branched (where possible) groups methyl, ethyl, n-propyl, isopropyl, n-butyl, isobutyl and tert-butyl.

$R_1$ and $R_2$ defined as $C_3$-$C_4$alkyl comprises the unbranched and preferably branched groups, e.g. isopropyl, isobutyl or tert-butyl.

In a preferred embodiment of the invention one of $R_1$ and $R_2$ represents hydrogen or $C_1$-$C_4$alkyl, particularly methyl or tert-butyl, and the other one represents $C_3$-$C_4$alkyl, particularly tert-butyl.

The numeral x represents zero or a numeral from one to three.

In the event that x is zero, the direct bond is defined.

In the event that x is one, the group $C_xH_{2x}$ represents methylene.

In the event that x represents the numeral two, the group —$[C_xH_{2x}]$— represents 1,1- or preferably 1,2-ethylene.

In the event that x represents the numeral three, the group —$[C_xH_{2x}]$— represents 1,1-, 1,2- or preferably 1,3-propylene.

$R_3$ defined as $C_8$-$C_{22}$alkyl represents, for example n-octyl, 2-ethylhexyl, 1,1,3,3-tetramethylbutyl, 1-methylheptyl, n-nonyl or 1,1,3-trimethylhexyl or $C_{10}$-$C_{22}$alkyl, particularly straight chain $C_{10}$-$C_{22}$alkyl, e.g. n-decyl, n-dodecyl, n-tetradecyl, n-hexadecyl or n-octadecyl or higher homologues thereof.

A particularly preferred compound, wherein $R_1$ and $R_2$ represent tert-butyl, $R_3$ represents $C_{10}$-$C_{22}$alkyl, particularly n-octadecyl, and x is the numeral two, is IRGANOX 1076: n-octadecyl-3-(3,5-di-tert-butyl-4-hydroxyphenyl)propionate.

In a compound (I) wherein $R_3$ represents groups of the partial formulae (A) and (B), $R_1'$ and $R_2'$ have the same meanings as defined above with regard to $R_1$ and $R_2$. Preferably one of $R_1'$ and $R_2'$ represents methyl or tert-butyl and the other one represents $C_3$-$C_9$alkyl, particularly tert-butyl.

In a compound (I) wherein $R_3$ represents the group of the partial formula (A), y represents a numeral from two to six, preferably three.

A particularly preferred compound (I), wherein one of $R_1$ and $R_2$ represents methyl and the other one represents tert-butyl, x represents two, $R_3$ represents a group of the partial formula A, wherein $R_1'$ and $R_2'$ are as defined as $R_1$ and $R_2$, x represents two and y represents three, is IRGANOX 245: ethylene-bis(oxyethylene)bis[3-(5-tert-butyl-4-hydroxy-m-tolyl)-propionate].

A particularly preferred compound (I), wherein $R_1$ and $R_2$ represents tert-butyl, x represents three and $R_3$ represents a group of the partial formula B, wherein $R_1'$ and $R_2'$ are as defined as $R_1$ and $R_2$ and x represents two, is IRGANOX 1010: tetrakis[3-(3,5-di-tert-butyl-4-hydroxy-phenyl)-propionate].

Component b)

Suitable polyvinyl alcohols are obtainable by hydrolysis of polyvinyl acetate and have a mean molar mass of approximately 15 000 to 250 000, which corresponds to a degree of polymerisation of about 500-2 500. Suitable polyvinyl alcohols have a degree of hydrolysis of about 70.0-99.9 mol % and are characterised by their viscosity (of a 4% aqueous solution) according to DIN 53 015 from 2.5 to 60.0 [mPa·s]. The ester value according to DIN 53 401 decreases from 220 to 8.0 [mg KOH/g] and the residual acetyl content from 17.0 to 0.2% by weight with an increasing degree of hydrolysis.

Suitable polyvinyl alcohols are the commercial products obtainable under the trademark Mowiol® (Clariant GmbH, D-65926 Frankfurt). Special reference is made to the products 3- and 15-96; 3-, 4-, 6-, 10-, 20- and 56-98; or 15- and 28-99 (fully hydrolysed grades). Particularly preferred are the commercial products 15-79; 3-83; 4-, 5-, 8-, 18-, 23-, 26-, 4-, 47- and 56-88; 30-92 (partially hydrolysed grades).

Component c)

Water is present in the dispersion as the remainder to make 100.0% by weight. The addition of purified, e.g. deionised or distilled, water is preferred.

The aqueous dispersion of the invention may comprise additional additives suitable for use in polymers, preferably additives customarily used for improving the chemical and physical properties of polymers containing these additives. The auxiliaries can be present in the dispersion in varying proportions, for example, in amounts of up to 40.0% by weight, preferably from 0.05% to 40.0% by weight, more preferably from 0.05% to 25.0% by weight, with particular preference from 0.05% to 10.0% by weight based on the total weight of the composition. Suitable groups of additional additives are listed up here by way of example: antioxidants selected from the group consisting of alkylated monophenols, alkylthiomethylphenols, hydroquinones and alkylated hydroquinones, tocopherols, hydroxylated thiodiphenyl ethers, alkylidene-bis-phenols, O—, N— and S-benzyl compounds, hydroxybenzylated malonates, aromatic hydroxybenzyl compounds, triazine compounds, benzylphosphonates, acylaminophenols, esters and amides of β-(3,5-di-t-butyl-4-hydroxyphenyl)propionic acid, β-(3,5-di-t-butyl-4-hydroxy-3-methylphenyl)-propionic acid, or β-(3,5-dicyclohexyl-4-hydroxyphenyl)propionic acid, ascorbic acid, aminic antioxidants, light stabilisers, phosphites, phosphines, phosponites, hydroxylamines, nitrones, thiosynergists, peroxide scavengers, polyamide stabilisers, basic co-stabilisers, nucleating agents, fillers and reinforcing agents, plasticisers, lubricants, emulsifiers, pigments, rheological additives, levelling assistants, optical brighteners, flame proofing agents, antistatic agents, blowing agents, benzofuranones and indolinones.

Suitable additives optionally present in the aqueous dispersion according to the present invention may be selected from the following non-exhaustive list of specific additives:

1. Antioxidants 1.1. Alkylated monophenols, for example 2,6-di-t-butyl-4-methylphenol, 2-butyl-4,6-dimethyl-phenol, 2,6-di-t-butyl-4-ethylphenol, 2,6-di-t-butyl-4-n-butylphenol, 2,6-di-t-butyl-4-isobutylphenol, 2,6-dicyclopentyl-4-methylphenol, 2-(1-methylcyclohexyl)-4,6-dimethylphenol, 2,6-dioctadecyl-4-methylphenol, 2,4,6-tricyclohexylphenol, 2,6-di-t-butyl-4-methoxymethylphenol, linear or side chain-branched nonylphenols; such as 2,6-dinonyl-4-methylphenol, 2,4-dimethyl-6-(1-methylundec-1'-yl)phenol, 2,4-dimethyl-6-(1'-methylheptadec-1'-yl)-phenol, 2,4-dimethyl-6-(1'-methyltridec-1'-yl)phenol and mixtures thereof.

1.2. Alkylthiomethylphenols, for example 2,4-dioctylthiomethyl-6-t-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-t-butyl-4-methoxyphenol, 2,5-di-t-butylhydroquinone, 2,5-di-t-amylhydroquinone, 2,6-diphenyl-4-octadecyloxyphenol, 2,6-di-t-butylhydroquinone, 2,5-di-t-butyl-4-hydroxyanisole, 3,5-di-t-butyl-4-hydroxyanisole, 3,5-di-t-butyl-4-hydroxyphenyl stearate, bis(3,5-di-t-butyl-4-hydroxyphenyl) adipate.

1.4. Tocopherols, for example α-, β-, γ- or δ-tocopherols and mixtures thereof (vitamin E).

1.5. Hydroxylated thiodiphenyl ethers, for example 2,2=-thio-bis(6-t-butyl-4-methylphenol), 2,2'-thio-bis(4-octylphenol), 4,4'-thio-bis(6-t-butyl-3-methylphenol), 4,4'- thio-bis(6-t-butyl-2-methylphenol), 4,4'-thio-bis(3,6-di-sec-amylphenol), 4,4'-bis(2,6-dimethyl-4-hydroxyphenyl)disulphide.

1.6. Alkylidene-bis-phenols, for example 2,2'-methylene-bis(6-t-butyl-4-methylphenol), 2,2'-methylene-bis(6-t-butyl-4-ethylphenol), 2,2'-methylene-bis[4-methyl-6-(l-methylcyclohexyl)phenol], 2,2'-methylene-bis(4-methyl-6-cyclohexylphenol), 2,2'-methylene-bis(6-nonyl-4-methylphenol), 2,2'-methylene-bis(4,6-di-t-butylphenol), 2,2'-ethylidene-bis(4,6-di-t-butylphenol), 2,2'-ethylidene-bis(6-t-butyl-4-isobutylphenol), 2,2'-methylene-bis[6-(α-methylbenzyl)4-nonylphenol], 2,2'-methylene-bis[6-(α,α-dimethylbenzyl)-4-nonylphenol], 4,4'-methylene-bis(2,6-di-t-butylphenol), 4,4'-methylene-bis(6-t-butyl-2-methylphenol), 1,1-bis(5-t-butyl-4-hydroxy-2-methylphenyl)butane, 2,6-bis(3-t-butyl-5-methyl-2-hydroxybenzyl)-4-methylphenol, 1,1,3-tris(5-t-butyl-4-hydroxy-2-methylphenyl)butane, 1,1-bis(5-t-butyl-4-hydroxy-2-methylphenyl)-3-n-dodecylmercaptobutane, ethylene glycol bis[3,3-bis(3'-t-butyl-4'-hydroxyphenyl)butyrate], bis(3-t-butyl-4-hydroxy-5-methylphenyl)dicyclopentadiene, bis[2-(3'-t-butyl-2'-hydroxy-5'-methylbenzyl)-6-t-butyl-4-methylphenyl]terephthalate, 1,1-bis(3,5-dimethyl-2-hydroxyphenyl)butane, 2,2-bis(3,5-di-t-butyl-4-hydroxyphenyl)propane, 2,2-bis(5-t-butyl-4-hydroxy-2-methylphenyl)-4-n-dodecylmercaptobutane, 1,1,5,5-tetra-(5-t-butyl-4-hydroxy-2-methylphenyl)pentane.

1.7. O—, N— and S-benzyl compounds, for example 3,5,3',5'-tetra-t-butyl-4,4'-dihydroxydibenzyl ether, octadecyl 4-hydroxy-3,5-dimethylbenzylmercaptoacetate, tridecyl 4-hydroxy-3,5-di-t-butylbenzylmercaptoacetate, tris(3,5-di-t-butyl-4-hydroxybenzyl)-amine, bis(4-t-butyl-3-hydroxy-2,6-dimethylbenzyl)dithioterephthalate, bis(3,5-di-t-butyl-4-hydroxybenyl)sulphide, isooctyl 3,5-di-t-butyl-4-hydroxybenzylmercaptoacetate.

1.8. Hydroxybenzylated malonates, for example dioctadecyl 2,2-bis(3,5-di-t-butyl-2-hydroxybenzyl)malonate, dioctadecyl 2-(3-t-butyl-4-hydroxy-5-methylbenzyl)malonate, didodecyl mercaptoethyl-2,2-bis(3,5-di-t-butyl-4-hydroxybenzyl)malonate, di-[4-(1,1,3,3-tetramethyl-butyl)phenyl]-2,2-bis(3,5-di-t-butyl-4-hydroxybenzyl)malonate.

1.9. Aromatic hydroxybenyl compounds, for example 1,3,5-tris(3,5-di-t-butyl-4-hydroxybenzyl)-2,4,6-trimethylbenzene, 1,4-bis(3,5-di-t-butyl-4-hydroxybenzyl)-2,3,5,6-tetramethylbenzene, 2,4,6-tris(3,5-di-t-butyl-4-hydroxybenzyl)phenol.

1.10. Triazine compounds, for example 2,4-bisoctylmercapto-6-(3,5-di-t-butyl-4-hydroxyanilino)-1,3,5-triazine, 2-octylmercapto-4,6-bis(3,5-di-t-butyl-4-hydroxyanilino)-1,3,5-triazine, 2-octylmercapto-4,6-bis(3,5-di-t-butyl-4-hydroxyphenoxy)-1,3,5-triazine, 2,4,6-tris(3,5-di-t-butyl-4-hydroxyphenoxy)-1,2,3-triazine, 1,3,5-tris(3,5-di-t-butyl-4-hydroxybenzyl)isocyanurate, 1,3,5-tris(4-t-butyl-3-hydroxy-2,6-dimethylbenzyl) isocyanurate, 2,4,6-tris(3,5-di-t-butyl-4-hydroxyphenylethyl)-1,3,5-triazine, 1,3,5-tris(3,5-di-t-butyl-4-hydroxyphenylpropionyl)hexahydro-1,3,5-triazine, 1,3,5-tris(3,5-dicyclohexyl-4-hydroxybenzyl)isocyanurate.

1.11. Benzylphosphonates for, example dimethyl 2,5-di-t-butyl-4-hydroxybenzyl-phosphonate, diethyl 3,5-di-t-butyl-4-hydroxybenzylphosphonate, dioctadecyl 3,5-di-t-butyl-4-hydroxybenzylphosphonate, dioctadecyl 5-t-butyl-4-hydroxy-3-methylbenzylphosphonate, the calcium salt of the monoethyl ester of 3,5-di-t-butyl-4-hydroxybenzylphosphonic acid.

1.12. Acylaminophenols, for example 4-hydroxylauranilide, 4-hydroxystearanilide, octyl N-(3,5-di-t-butyl-4-hydroxyphenyl)carbamate.

1.13. Esters of β-(3,5-di-t-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(2-hydroxyethyl) isocyanurate, N,N'-bis(2-hydroxyethyl) oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-t-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, di-ethylene glycol, triethylene glycol, pentaerythritol, tris(2-hydroxyethyl) isocyanurate, N,N'-bis(2-hydroxyethyl) oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(2-hydroxyethyl) isocyanurate, N,N'-bis(2-hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-t-butyl-4-hydroxyphenylacetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(2-hydroxyethyl) isocyanurate, N,N'-bis(2-hydroxyethyl)-oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-t-butyl-4-hydroxyphenyl)propionic acid e.g. N,N'-bis(3,5-di-t-butyl-4-hydroxyphenyl-propionyl)hexamethylenediamide, N,N'-bis(3,5-di-t-butyl-4-hydroxyphenyl-propionyl)trimethylenediamide, N,N'-bis(3,5-di-t-butyl-4-hydroxyphenylpropionyl)hydrazide, N,N'-bis[2-(3-[3,5-di-t-butyl-4-hydroxyphenyl]propionyloxy)ethyl]oxamide (Naugard® XL-1 from Uniroyal).

1.18. Ascorbic acid (vitamin C).

1.19. Aminic antioxidants for example N,N'-diisopropyl-p-phenylenediamine, N,N'-di-sec-butyl-p-phenylenediamine, N,N'-bis(1,4-dimethyl-pentyl)-p-phenylenediamine, N,N'-bis(1-ethyl-3-methyl-pentyl)-p-phenylenediamine, N,N'-bis(1-methylheptyl)-p-phenylenediamine, N,N'-di-cyclohexyl-p-phenylenediamine, N,N'-diphenyl-p-phenylenediamine, N,N'-di-(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulphonamido)-diphenylamine, N,N'-di-methyl-N,N'-di-sec-butyl-p-phenylenediamine, diphenylamine, N-allyldiphenylamine, 4-iso-propoxydiphenylamine, N-phenyl-1-naphthylamine, N-(4-t-octylphenyl)-1-naphthylamine, N-phenyl-2-naphthylamine, octylated diphenylamine, for example p,p'-di-t-octyldiphenylamine, 4-n-butylaminophenol, 4-butyrylaminophenol, 4-nonanoylaminophenol, 4-dodecanoylaminophenol, 4-octadecanoylaminophenol, di-(4-methoxyphenyl)amine, 2,6-di-t-butyl-4-dimethylaminomethylphenol, 2,4'-diaminodiphenylmethane, 4,4'-diaminodiphenylmethane, N,N,N',N'-tetramethyl-4,4'-diamino-diphenylmethane, 1,2-di[(2-methylphenyl)amino]ethane, 1,2-diphenylaminopropane, (o-tolyl)biguanide, di-[4-(1',3'-dimethylbutyl)phenyl]amine, t-octylated N-phenyl-1-naphthylamine, a mixture of mono- and dialkylated t-butyl/t-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, mixtures of mono- and dialkylated t-butyldiphenylamines, 2,3-dihydro-3,3-dimethyl-4H-1,4-benzothiazine, phenothiazine, a mixture of mono- and dialkylated t-butyl/t-octyl-phenothiazines, a mixture of mono- and dialkylated t-octyl-phenothiazines, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethyl-piperidin-4-yl)sebacate, 2,2,6,6-tetramethylpiperidin-4-one and 2,2,6,6-tetramethylpiperidin-4-ol.

1.20. Polyphenolic antioxidants, for example derivates of p-cresol and dicyclopentadiene for example ®WINGSTAY L (Goodyear), CAS-Nb 68610-51-5.

2. UV-Absorbers and Light Stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)-benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; R—CH$_2$CH$_2$—COO—CH$_2$CH$_2$$\frac{}{2}$ wherein R represents 3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole; 2-[2'-hydroxy-3'-(1,1,3,3-tetramethylbutyl)-5'-(α,α-dimethylbenzyl)phenyl]benzotriazole.

2.2.2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)-resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4 Acrylates for example ethyl lα-cyano-β,β-diphenyl acrylate or isooctyl αl-cyano-β,β-diphenyl acrylate, methyl α-carbomethoxycinnamate, methyl αl-cyano-βl-methyl-p-methoxy-cinnamate or butyl α-cyano-β-methyl-p-methoxy-cinnamate, methyl αl-carbomethoxy-p-methoxycinnamate and N-(α-carbomethoxy-β-cyanovinyl)-2-methylindoline.

2.5 Nickel compounds, for example nickel complexes of 2,2'-thio-bis[4-(1,1,3,3-tetramethylbutyl)phenol], such as the 1:1- or 1:2-complex, with or without additional ligands, such as n-butylamine, triethanolamine or N-cyclohexyldiethanolamine, nickel dibutyldithiocarbamate, nickel salts of monoalkyl esters, such as of the methyl or ethyl ester, of 4-hydroxy-3,5-di-t-butylbenzylphosphonic acid, nickel complexes of ketoximes, e.g. of 2-hydroxy-4-methylphenyl undecyl ketoxime, nickel complexes of 1-phenyl-4-lauroyl-5-hydroxypyrazole, with or without additional ligands.

2.6 Sterically hindered amines, for example bis(2,2,6,6-tetramethylpiperidin-4-yl) sebacate, bis(2,2,6,6-tetramethylpiperidin-4-yl) succinate, bis(1,2,2,6,6-pentamethylpiperidin-4-yl) sebacate, bis(1-octyloxy-2,2,6,6-tetramethylpiperidin-4-yl) sebacate, bis(1,2,2,6,6-pentamethylpiperidyl)n-butyl-3,5-di-t-butyl-4-hydroxybenzylmalonate, the condensate of 1-hydroxyethyl-2,2,6,6-tetramethyl-4-hydroxypiperidine and succinic acid, the linear or cyclic condensates of N,N'-bis(2,2,6,6-tetramethyl-4-piperidyl)hexamethylenediamine and 4-t-octylamino-2,6-dichloro-1,3,5-s-triazine, tris(2,2,6,6-tetramethyl-4-piperidyl)nitrilotriacetate, tetrakis(2,2,6,6-tetramethyl-4-piperidyl) 1,2,3,4-butanetetraoate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-t-butylbenzyl)malonate, 3-n-octyl-7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, the linear or cyclic condensates of N,N'-bis(2,2,6,6-tetramethyl-4-piperidyl) hexamethylenediamine and 4-morpholino-2,6-dichloro-1,3,5-triazine, the condensate of 2-chloro-4,6-di(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, the condensate of N,N-bis(2,2,6,6-tetramethyl-4-piperidyl)-hexamethylenediamine and 4-cyclohexylamino-2,6-dichloro-1,3,5-triazine, the condensate of 1,2-bis(3-aminopropylamino)ethane and 2,4,6-trichloro-1,3,5-triazine and also 4-butylamino-2,2,6,6-tetramethylpiperidine (CAS Reg. No. [136504-96-6]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4.5]decane, the reaction product of 7,7,9,9-tetramethyl-2-cycloundecyl-1-oxa-3,8-diaza-4-oxospiro[4.5]decane and epichlorohydrine, 1,1-bis(1,2,2,6,6-pentamethyl-4-piperidyloxycarbonyl)-2-(4-methoxyphenyl)ether, N,N'-bis-formyl-N,N'-bis(2,2,6,6-tetramethyl-4-piperidyl)-hexamethylenediamine, the diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, the reaction product of maleic anhydride-α-olefin copolymer and 2,2,6,6-tetramethyl-4-aminopiperidine or 1,2,2,6,6-pentamethyl-4-aminopiperidine.

2.7 Oxalamides, for example 4,4'-dioctyloxyoxanilide, 2,2'-diethoxy-oxanilide, 2,2'-dioctyloxy-5,5'-di-t-butyloxanilide, 2,2'-didodecyloxy-5,5'-di-t-butyloxanilide, 2-ethoxy-2'-ethyloxanilide, N,N '-bis(3-dimethylaminopropyl)oxalamide, 2-ethoxy-5-t-butyl-2'-ethyloxanilide and its mixture with 2-ethoxy-2'-ethyl-5,4'-di-t-butyloxanilide and mixtures of o-and p-methoxy- and of o- and p-ethoxy-disubstituted oxanilides.

2.8 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6bis(4-methylphenyl)-1,3,5-triazine, 2-(2-hydroxy4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy4-(2-hydroxy-3-octyloxypropyloxy)-phenyl]-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example, N,N '-diphenyloxalamide, N-salicylal-N'-salicyloyl hydrazine, N,N'-bis(salicyloyl)hydrazine, N,N'-bis(3,5-di-t-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites, phosphines and phosphonites, for example triphenyl phosphite, diphenyl alkyl phosphites, phenyl dialkyl phosphites, tris(nonylphenyl) phosphite, trilauryl phosphite, trioctadecyl phosphite, trimethylphosphine, tri-n-butylphosphine, triphenylphosphine, distearyl pentaerythritol diphosphite, tris(2,4-di-t-butylphenyl) phosphite, diisodecyl pentaerythritol diphosphite, bis(2,4-di-t-butylphenyl) pentaerythritol diphosphite, bis(2,6-di-t-butyl-4-methylphenyl)pentaerythritol diphosphite, bisisodecyloxypentaerythritol diphosphite, bis(2,4-di-t-butyl-6-methylphenyl)pentaerythritol diphosphite, bis(2,4,6-tri-t-butylphenyl)pentaerythritol diphosphite, tristearyl sorbitol triphosphite, tetrakis(2,4-di-t-butylphenyl) 4,4'-biphenylene diphosphonite, 6-isooctyloxy-2,4,8,10-tetra-t-butyl-12H-dibenzo[d,g]-1,3,2-dioxaphosphocin, 6-fluoro-2,4,8,10-tetra-t-butyl-12-methyl-dibenzo[d,g]-1,3,2-dioxaphosphocin, bis(2,4-di-t-butyl-6-methylphenyl)methyl phosphite, bis(2,4-di-t-butyl-6-methylphenyl)ethyl phosphite, 2,2',2''-nitrilo[triethyl-tris(3,3',5,5''tetra-t-butyl-1,1'-biphenyl-2,2'-diyl) phosphite], 2-ethylhexyl (3,3',5,5'-tetra-t-butyl-1,1'-biphenyl-2,2,-diyl) phosphite.

Particular preference is given to using the following phosphites: tris(2,4-Di-t-butylphenyl) phosphite (Irgafos®68, Ciba Specialty Chemicals), tris(nonylphenyl) phosphite and the phosphites selected from the group comprising the structural formulae (a), (b), (c), (d), (e), (f) and (g) given below:

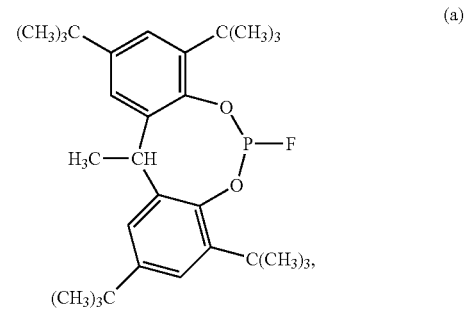

(a)

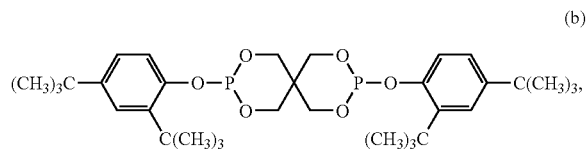

(b)

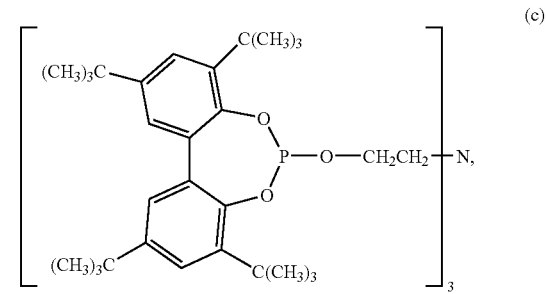

(c)

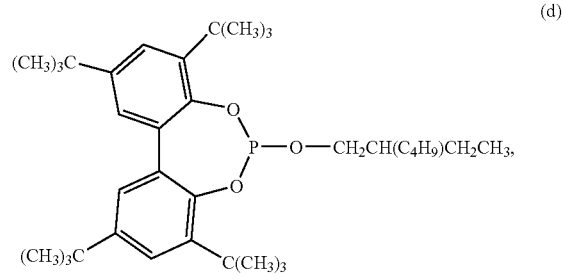

(d)

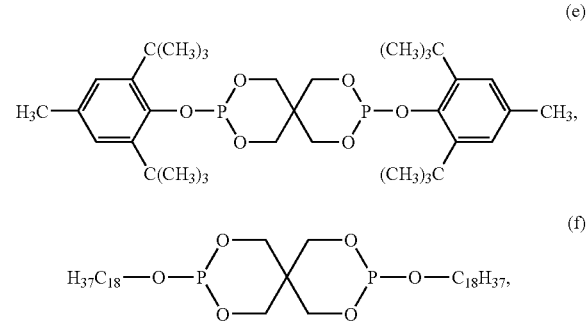

(e)

(f)

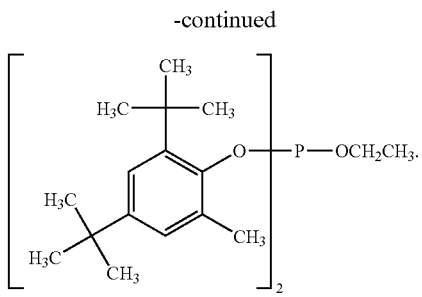

(g)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine from hydrogenated tallow fatty amines.

6. Nitrones, for example N-benzyl α-phenyl nitrone, N-ethyl α-methyl nitrone, N-octyl α-heptyl nitrone, N-lauryl α-undecyl nitrone, N-tetradecyl α-tridecyl nitrone, N-hexadecyl α-pentadecyl nitrone, N-octadecyl α-heptadecyl nitrone, N-hexadecyl α-heptadecyl nitrone, N-octadecyl α-pentadecyl nitrone, N-heptadecyl α-heptadecyl nitrone, N-octadecyl α-hexadecyl-nitrone, and nitrones derived from N,N-dialkylhydroxylamines prepared from hydrogenated tallow fatty amines.

7. Thiosynergists, for example dilauryl or distearyl thiodipropionate.

8. Peroxide scavengers, for example esters of l-thiodipropionic acid, for example the lauryl, stearyl, myristyl or tridecyl esters, mercaptobenzimidazole, the zinc salt of 2-mercaptobenzimidazole, zinc dibutyldithiocarbamate, dioctadecyl disulphide, pentaerythritol tetrakis-(lβ-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate, potassium palmitate, antimony pyrocatecholate or zinc pyrocatecholate.

11. Nucleating agents, for example inorganic substances, such as talc, metal oxides, such as titanium dioxide or magnesium oxide, phosphates, carbonates or sulphates of, preferably, alkaline earth metals; organic compounds, such as mono- or polycarboxylic acids and their salts, such as 4-t-butylbenzoic acid, adipic acid, diphenyl acetic acid, sodium succinate or sodium benzoate; and polymeric compounds, for example ionic copolymers (ionomers).

12. Benzofuranones and indolinones, as described, for example, in U.S. Pat. Nos. 4,325,863; 4,338,244; 5,175,312; 5,216,052; 5,252,643; DE-A-4 316 611; DE-A-4 316 622; DE-A-4 316 876; EP-A-0 589 839 or EP-A-0 591 102, or 3-[4-(2-acetoxyethoxy)phenyl]-5,7-di-t-butylbenzofuran-2-one, 5,7-di-t-butyl-3-[4-(2-stearoyloxyethoxy)phenyl]benzofuran-2-one, 3,3'-bis[5,7-di-t-butyl-3-(4-[2-hydroxyethoxy]phenyl)benzofuran-2-one], 5,7-di-t-butyl-3-(4-ethoxyphenyl)benzofuran-2-one, 3-(4-acetoxy-3,5-dimethylphenyl)-5,7-di-t-butylbenzofuran-2-one, 3-(3,5-dimethyl-4-pivaloyloxyphenyl)-5,7-di-t-butylbenzofuran-2-one, 3-(3,4-dimethylphenyl)-5,7-di-t-butylbenzofuran-2-one, 3-(2,3-dimethylphenyl)-5,7-di-t-butylbenzofuran-2-one.

13. Other additives, for example plasticisers, lubricants, emulsifiers, pigments, rheological additives, catalysts, levelling assistants, optical brighteners, flame proofing agents, antistatic agents or blowing agents.

A preferred embodiment of the invention relates to an aqueous dispersion comprising
a) 1.0-80.0% (By weight) of a compound of the formula (I);
b) 0.1-10.0% Polyvinyl alcohol having a degree of polymerisation of about 500-2 500 and a degree of hydrolysis of about 70.0-99.9%; and, optionally, further additives; and
c) Water as the remainder to make 100.0% by weight.

A particularly preferred embodiment relates to an aqueous dispersion comprising
a) Octadecyl-3-(3,5-di-tert-butyl-4-hydroxyphenyl)-propionate;
b) Polyvinyl alcohol having a degree of polymerisation of about 500-2 500 and a degree of hydrolysis of about 79.0-94.0%; and, optionally, further additives; and
c) Water as the remainder to make 100.0% by weight.

A highly preferred embodiment relates to an aqueous dispersion comprising
a) 10.0-60.0% (By weight) octadecyl-3-(3,5-di-tert-butyl-4-hydroxyphenyl)-propionate;
b) 0.1-10.0% Polyvinyl alcohol having a degree of polymerisation of about 500-2 500 and a degree of hydrolysis of about 79.0-94.0%; and, optionally, further additives; and
c) Water as the remainder to make 100.0% by weight.

Another highly preferred embodiment relates to an aqueous dispersion comprising
a) 40.0-50.0% (By weight) octadecyl-3-(3,5-di-tert-butyl-4-hydroxyphenyl)propionate;
b) 1.0-5.0% Polyvinyl alcohol having a degree of polymerisation of about 500-2 500 and a degree of hydrolysis of about 79.0-94.0%; and, optionally, further additives; and
c) Water as the remainder to make 100.0% by weight.

The process for preparing the aqueous dispersion defined above is novel and inventive. Therefore, the present invention also relates to a process for preparing the aqueous dispersion defined above which is characterised in that a molten phase of the compound (I) is dispersed in an aqueous phase, wherein polyvinyl alcohol having a degree of polymerisation of about 500-2500 and a degree of hydrolysis of about 70.0-99.9%; and, optionally, further additives are present.

In a preferred embodiment of the process, an emulsion of the o/w-type comprising the components a) and b) within the aqueous phase is obtained. The emulsion is characterised by long storage stability. Another advantage of the process is seen in the fact that crystalline solids of phenolic antioxidants are reduced to desirable particle sizes without wet-grinding the solid. This reduces the costs for preparing dispersions of phenolic antioxidants.

According to a preferred embodiment of the process a solid compound of the formula (I) or mixture with other compounds of the formula (I) is heated, particularly to temperatures between 55° C. and 100° C., to give a melt which is then dispersed in an aqueous dispersion comprising from 2.0 to 20.0% (by weight) polyvinyl alcohol having a degree of polymerisation of about 500-2 500 and a degree of hydrolysis of about 70.0-99.9%; and, optionally, further additives. The amount of a compound of the formula (I) to be dispersed may vary within wide limits to give a concentration between about 1.0-80.0% (by weight), preferably 10.0-60.0%, and most preferably 40.0-50.0%, of a compound of the formula (I). The dispersion is made homogeneous by conventional mixing methods, such as the ones known for preparing emulsions. Mixing can be effected by vigorous shaking using a dispersing machine, for example a Vortex mixer, or using dispersing machines of the ®POLYTRON type (Kinematica A G, Littau Switzerland) or dispersing machines produced by IKA (Staufen Germany), a static mixer and conventional stirring machines having a propeller or paddle blade or using a magnetic stirrer or phase mixer.

In order to obtain an especially homogeneous mixture, stirring is carried out at high speed, for example using Y-beam agitators (®Y-Strahl, ®Ultraturrax) or stirring machines produced by Polytron, for example Polytron PT 3000 or DH 30/30 or using a high pressure rotor/stator mixer, for example the BUSS-Mischturbine.

Approximately from 0.1 to 90.0% by weight of the constituents (without the water component), based on the total weight of the dispersion, preferably approximately from 1.0 to 60.0% by weight, can be dispersed in the aqueous phase. In the event that no recrystallisation occurs, the dispersion obtainable can be defined as an emulsion. The emulsion is storage stable under the following conditions, at 0-40° C. for a period of at least 3 months.

By means of analytical measurements from microscopic, laser light scattering or electron micrographs, the size and homogeneity of the particles present in the aqueous dispersion, e.g. droplets or solid particles, is determined.

An average droplet size (X50) of less than 1.5 µ for a population of ≧99% (X99)<6.0 µ is typical. In the event that solid particles are present, an average particle size (X50) of less than 2.0 µ for a population of ≧99% (X99)<15.0 µ is observed.

A representative sample, as determined by droplet size analysis by laser light scattering (Sympatec Helos), is characterised by a median droplet size of 1.3 µ (X50) and 90%<3.0 ρ (X90) and a maximum droplet size of <5.0 µ (X99).

Subsequent recrystallisation with the conversion to an aqueous dispersion comprising solid particles is carried out, if desired, by inoculating the emulsion with suitable crystal seeds. The crystals present in the aqueous dispersion may then, if desired, be converted to smaller particles sizes by conventional grinding methods, such as wet grinding with a ball mill. Even though the wet grinding step is carried out subsequently, a clear advantage is seen in the fact that crystals of desirable particle size are obtained from a melt rather than other forms of solids, such as powders or precipitates. This prevents the inclusion of air or other undesirable particles.

A further embodiment of the invention relates to the further processing of the aqueous dispersion defined above. The dispersion is particularly suitable for stabilising organic material, especially polymers, specifically styrene (co) polymers, such as polystyrene, ABS (acrylonitrile-butadiene-styrene), IPS (impact polystyrene, graft copolymer of styrene on polybutadiene), MBS (methacrylonitrile-butadiene-styrene) and SBS (styrene-butadiene-styrene). In this context, they act in particular as antioxidants.

Another embodiment the invention relates to polymer compositions comprising
  a') A compound of the formula (I), wherein $R_1$, $R_2$, $R_3$, x and y are as defined above and, optionally further additives;
  b') Polyvinyl alcohol having a degree of polymerisation of 500-2500 and a degree of hydrolysis of 70.0-99.9%; and
  c') The polymer material to be stabilised against oxidative, thermal or light-induced degradation. Another preferred embodiment the invention relates to polymer compositions comprising
  a') 1.0-40.0% (By weight) of a compound of the formula (I), wherein $R_1$, $R_2$, $R_3$, x and y are as defined above and, optionally further additives;
  b') 0.1-5.0% Polyvinyl alcohol having a degree of polymerisation of 500-2500 and a degree of hydrolysis of 70.0-99.9%; and
  c') 10.0-95.0% Polymer material to be stabilised against oxidative, thermal or light-induced degradation.

The incorporation into the polymer materials can be carried out, for example, by mixing in the composition and, if desired, further additives in accordance with known methods. The incorporation into the polymeric material may take place prior to or during the shaping operation or by applying the composition to the polymer, with or without subsequent evaporation of the solvent. In the case of elastomers, these can also be stabilised as lattices. The invention therefore relates in particular to compositions, wherein the dispersion defined above is incorporated into and/or chemically linked with an elastomer/polymer.

The aqueous dispersion can also be added in the form of a master batch, which contains the individual components defined above in a concentration, for example, of from 2.5 to 25.0% by weight, to the polymer material which is to be stabilised.

The dispersion defined above can expediently be incorporated into polymers by the following methods:
  As emulsion or dispersion (e.g. to lattices or emulsion polymers);
  As a dry mix during the mixing in of additional components or polymer mixtures;
  By direct addition to the processing apparatus (e.g. extruder, internal mixer, etc.);
  As a solution or melt.

Therefore, the present invention also relates to the process for the preparation of the polymer composition, which comprises incorporating within the polymer material to be stabilised against oxidative, thermal or light-induced degradation the aqueous dispersion defined above.

The polymer compositions can be employed in various forms and processed to give various products, for example as or to films, fibres, tapes, moulding compounds or profiles, or as binders for coating materials, adhesives or putties.

Examples of polymer materials to be stabilised are:
1. Polymers of monoolefins and diolefins, for example polypropylene, polyisobutylene, polybut-1-ene, poly-4-methylpent-1-ene, polyisoprene or polybutadiene, as well as polymers of cycloolefins, for example of cyclopentene, norbornene or dicyclopentadiene; furthermore polyethylene (which optionally can be crosslinked), for example high density polyethylene (HDPE), low density polyethylene (LDPE), linear low density polyethylene (LLDPE), branched low density polyethylene (BLDPE).

Polyolefins, i.e. polymers of monoolefins exemplified in the preceding paragraph, in particular polyethylene and polypropylene, can be prepared by different, and especially by the following, methods:
a) Radical polymerisation (normally under high pressure and at elevated temperature)
b) Catalytic polymerisation using a catalyst that normally contains one or more metals of group IVb, Vb, VIb or VIII of the Periodic Table. These metals usually have one or more ligands, such as oxides, halides, alcoholates, esters, ethers, amines, alkyls, alkenyls and/or aryls that may be either π- or σ-coordinated. These metal complexes may be in the free form or fixed on substrates, for example on activated magnesium chloride, titanium(III) chloride, alumina or silicon oxide. These catalysts may be soluble or insoluble in the polymerisation medium. The catalysts can be active as such in the polymerisation or further activators may be used, for example metal alkyls, metal hydrides, metal alkyl halides, metal alkyl oxides or metal alkyloxanes, the metals being elements of groups Ia, IIa and/or IIa of the Periodic Table. The activators may be modified, for example, with further ester, ether, amine or silyl ether groups. These catalyst systems are usually termed Phillips, Standard Oil Indiana, Ziegler (Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene-propylene copolymers, linear low density polyethylene (LLDPE) and mixtures thereof with low density polyethylene (LDPE), propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and their copolymers with carbon monoxide or ethylene-acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned under 1), for example polypropylene-ethylene-propylene copolymers, LDPE-ethylene-vinyl acetate copolymers, LDPE-ethylene-acrylic acid copolymers, LLDPE-ethylenevinyl acetate copolymers, LLDPE-ethylene-acrylic acid copolymers and alternating or random polyalkylene-carbon monoxide copolymers and mixtures thereof with other polymers, for example polyamides.

4. Hydrocarbon resins (for example $C_5$-$C_9$) including hydrogenated modifications thereof (e.g. tackifier resins) and mixtures of polyalkylenes and starch.

5. Polystyrene, poly(p-methylstyrene), poly(alpha-methylstyrene).

6. Copolymers of styrene or alpha-methylstyrene with dienes or acrylic derivatives, for example styrene-butadiene, styrene-acrylonitrile, styrene-alkyl methacrylate, styrene-butadiene-alkyl acrylate, styrene-butadiene-alkyl methacrylate, styrene-maleic anhydride, styrene-acrylonitrile-methyl acrylate; mixtures of high impact strength of styrene copolymers and another polymer, for example a polyacrylate, a diene polymer or an ethylene-propylene-diene terpolymer; and block copolymers of styrene such as styrene-butadiene-styrene (SBS), styrene-isoprene-styrene, styrene-ethylene-butylene-styrene or styrene-ethylene-propylene-styrene.

7. Graft copolymers of styrene or alpha-methylstyrene, for example styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, as well as mixtures thereof with the copolymers mentioned under 6), for example the copolymer mixtures known as ABS, MBS, ASA or AES polymers.

8. Halogen-containing polymers such as polychloroprene, chlorinated rubber, chlorinated or sulphochlorinated polyethylene, copolymers of ethylene and chlorinated ethylene, epichlorohydrine homo- and copolymers, especially polymers of halogen-containing vinyl compounds, for example polyvinyl chloride, polyvinylidene chloride, polyvinyl fluoride, polyvinylidene fluoride; as well as copolymers thereof such as vinyl chloride-vinylidene chloride, vinyl chloride-vinyl acetate or vinylidene chloride-vinyl acetate.

9. Polymers derived from α,β-unsaturated acids and derivatives thereof such as polyacrylates and polymethacrylates, polymethyl methacrylates, polyacrylamides and polyacrylonitriles, impact-modified with butyl acrylate.

10. Copolymers of the monomers mentioned under 9) with each other or with other unsaturated monomers, for example acrylonitrile-butadiene copolymers, acrylonitrile-alkylacrylate copolymers, acrylonitrile-alkoxyalkyl acrylate copolymers, acrylonitrile-vinyl halide copolymers or acrylonitrile-alkyl methacrylate-butadiene terpolymers.

11. Polymers derived from unsaturated alcohols and amines or the acyl derivatives or acetals thereof, such as polyvinyl alcohol, polyvinyl acetate, polyvinyl stearate, polyvinyl benzoate, polyvinyl maleate, polyvinyl butyral, polyallyl phthalate or polyallylmelamine; as well as their copolymers with olefins mentioned in paragraph 1.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes that contain comonomers, for example ethylene oxide; polyacetals modified with thermoplastic polyurethanes, acrylates or MBS.

14. Polyphenylene oxides and sulphides, and mixtures thereof with styrene polymers or polyamides.

15. Polyurethanes derived from hydroxyl-terminated polyethers, polyesters and polybutadienes on the one hand and aliphatic or aromatic polyisocyanates on the other, as well as precursors thereof.

16. Polyamides and co polyamides derived from diamines and dicarboxylic acids and/or from aminocarboxylic acids or the corresponding lactams, such as polyamide 4, 6, 6/6, 6/10, 6/9, 6/12, 4/6, 12/12,11 and 12, aromatic polyamides starting from m-xylene, diamine and adipic acid; polyamides prepared from hexamethylenediamine and isophthalic and/or terephthalic acid and with or without an elastomer as modifier, for example poly-2,4,4-trimethylhexamethylene terephthalamide or poly-m-phenylene isophthalamide. Block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol. As well as polyamides or copolyamides modified with EPDM or ABS; and polyamides condensed during processing (RIM polyamide systems).
17. Polyureas, polyimides, polyamide-imides and polybenzimidazoles.
18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, as well as block polyether esters derived from hydroxyl-terminated polyethers; and also polyesters modified with polycarbonates or MBS.
19. Polycarbonates and polyester carbonates.
20. Polysulphones, polyether sulphones and polyether ketones.
21. Crosslinked polymers derived from aldehydes on the one hand and phenols, urea or melamine on the other hand, such as phenol/formaldehyde resins, urea/formaldehyde resins and melamine/formaldehyde resins.
22. Drying and non-drying alkyd resins.
23. Unsaturated polyester resins derived from co polyesters of saturated and unsaturated dicarboxylic acids with polyhydric alcohols and vinyl compounds as cross-linking agents, and also halogen-containing modifications thereof of low flammability.
24. Crosslinkable acrylic resins derived from substituted acrylates, for example from epoxy acrylates, urethane acrylates or polyester acrylates.
25. Alkyd resins, polyester resins and acrylate resins crosslinked with melamine resins, urea resins, polyisocyanates or epoxy resins.
26. Crosslinked epoxy resins derived from polyepoxides, for example from bisglycidyl ethers, or cycloaliphatic diepoxides.
27. Natural polymers such as cellulose, natural rubber, gelatin and derivatives thereof which have been chemically modified in a polymer-homologous manner, for example cellulose acetates, cellulose propionates and cellulose butyrates, or the cellulose ethers such as methylcellulose; and also rosins and derivatives.
28. Blends (polyblends) of the aforementioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP or PA/PPO.
29. Aqueous emulsions of natural or synthetic rubbers, for example natural rubber latex or lattices of carboxylated styrene-butadiene copolymers.
30. Natural and synthetic organic substances which are pure monomeric compounds or mixtures thereof, for example mineral oils, animal or vegetable fats, oils and waxes, or oils, waxes and fats based on synthetic esters (e.g. phthalates, adipates, phosphates or trimellitates), and also blends of synthetic esters with mineral oils in any desired proportions by weight, as are employed, for example, as spin finishes, and also the aqueous emulsions thereof.

The invention also relates to compositions comprising the components a'), b') and c') and additives customarily present in polymer compositions.

Such additives can be added in small amounts, e.g. UV absorbers or light stabilisers, for example from the series of hydroxyphenylbenzotriazoles, hydroxyphenylbenzophenones, oxalamides and hydroxyphenyl-s-triazines. Especially suitable are light stabilisers from the group of so-called sterically hindered amines (HALS), e.g. the 2-(2-hydroxyphenyl)-1,3,5-triazine or 2-hydroxyphenyl-2H-benzotriazole types. Examples of light stabilisers of the 2-(2-hydroxyphenyl)-1,3,5-triazine type are known from the patent literature, e.g. U.S. Pat. No. 4,619,956, EP-A-434 608, U.S. Pat. Nos. 5,198,498, 5,322,868, 5,369,140, 5,298, 067, WO-94/18278, EP-A-704 437, GB-A-2 297 091 or WO-96/28431.

The polymer compositions defined above may comprise additional additives, too, for example thickeners, fillers, e.g. calcium carbonate, silicates, glass or glass fibre material, talcum, kaolin, mica, barium sulphate, metal oxides and hydroxides, carbon black, graphite, powdered wood and powdered or fibrous material of other natural products, synthetic fibres, plasticisers, lubricants, emulsifiers, pigments, flow auxiliaries, catalysts, optical brighteners, flame-retardants, antistatics and blowing agents.

The compositions according to the present invention can be used for a very wide variety of technical applications, for example as adhesives, detergent adjuvants, detergents, dispersants, emulsifiers, surfactants, antifoams, tackifiers, corrosion inhibitors, viscosity improvers, lubricants, flow improvers, thickeners, cross linking agents, as additives for water treatment, electronic materials, paints and lacquers, coatings, inks, photo developers, super absorbents, cosmetics, preservatives, or as biocides or modifiers and adjuvants for asphalt, textiles, ceramics and wood.

The following Examples illustrate the invention (s: second(s); min: minutes; h: hour(s); temperatures in degrees Celsius (° C.); rpm: rotations per minute; l: liter(s); percentages in weight percent based on the total weight of the composition):

EXAMPLE 1

Preparation of an aqueous, non-ionic emulsion of 50 weight % octadecyl-3-(3,5-di-tert-butyl-4-hydroxyphenyl)-propionate 350 g Octadecyl-3-(3,5-di-tert-butyl-4-hydroxyphenyl)-propionate (=IRGANOX 1076) powder are melted at 55° C.

in a 1 l glass reaction vessel. 350 g of an aqueous non-ionic surfactant solution is prepared in a 1.5 l sulphuration flask by adding 28 g MOWIOL 8-88 (degree of hydrolysis: 87-89%) to 322 g deionised cold water under stirring. The suspension is then heated up to 80-85° C. for 1 hour to ensure a complete dissolution. The clear colourless solution is then cooled to 25° C. The molten mass of low viscosity is dosed to the cooled surfactant solution at 53-55° C. during 30 min and dispersed vigorously for 35-40 min using a Y-beam stirrer (10 000 to 15 000 rpm, 45 mm diameter), keeping the dispersion at 25-30° C. with a water bath.

A storage stable, finely dispersed o/w emulsion of 50% IRGANOX 1076 is obtained which has the following properties:

pH: 6.2-6.5

Droplet size distribution (laser light diffraction analysis with Sympatec analyser Helos): median value (X50) =1.2-1.4 µ and percentage of droplet>5.0 µ lower than 1% (X99<5 µ)

Dynamic viscosity (at 25° C., depends on shear velocity (viscoelastic)): 875 mPa·s at 139/s and 1270 mPa·s at 58/s (Haake viscosimeter type VT50, rotative element: MV DIN)

Storage stability at 40° C.: no phase separation no crystallisation within 3 months No crystallisation is observed after inoculation of seed crystals at a storage temperature up to 40° C.

EXAMPLE 2

108 g IRGANOX 1076 are melted at 60° C. in a 1 l glass reaction vessel. 432 g Ethylene-bis (oxyethylene)-bis[3-(5-tert-butyl-4-hydroxy-m-tolyl)-propionate] (=IRGANOX 245) are added in portions to the molten mass and dissolved therein at 80-90° C. 660 g of an aqueous non-ionic surfactant dispersion is prepared in a 1.5 l sulphuration flask by adding and dissolving 60 g MOWIOL 8-88 to 600 g deionised water like in Example 1. The solution is kept at 85° C. in a water bath. The molten mixture of moderate viscosity (160 mPa·s) is added at 90° C. for 15-20 min to the surfactant solution and then emulgated at 85-87° C. under medium agitation (propeller stirrer, 500-700 rpm) to obtain a droplet size from up to 30 µ. At the end of the addition the emulsion is further emulgated for further 30 min by stirring with a Y-beam stirrer at a speed varying from 5 000 up to 15 000 rpm. The emulsion is then cooled down for 15 min under normal stirring (propeller stirrer, 250 rpm) to room temperature.

A storage stable, finely dispersed emulsion is obtained, which has the following properties:

Microscopic and laser diffraction analysis reveal a median droplet size of 1.1 µ and a maximum droplet size (X99) of 3.1 µ

The flow properties of the emulsion are Newtonian. Dynamic viscosity: 585-600 mPa·s at 25° C. (Viscosimeter type HAAKE VT50, rotative element MV DIN)

The emulsion is storage stable at least 1 week at room temperature. Suitable by-products (<0.2% by weight) can be added to increase the shelf time if desired Partial recrystallisation of IRGANOX 245 can be observed during storage at T>25° C. especially at the interface liquid/air.

The invention claimed is:

1. An aqueous emulsion comprising
a) a compound of the formula:

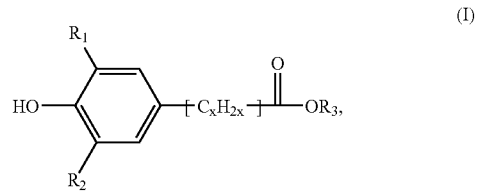

wherein
one of $R_1$ and $R_2$ independently of one another represents hydrogen or $C_1$-$C_4$alkyl and the other one represents $C_3$-$C_4$alkyl;
x represents zero (direct bond) or a numeral from one to three; and
$R_3$ represents $C_8$-$C_{22}$alkyl or a group of the partial formulae

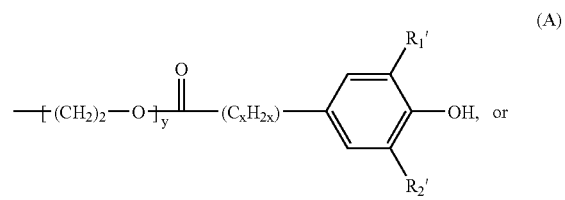

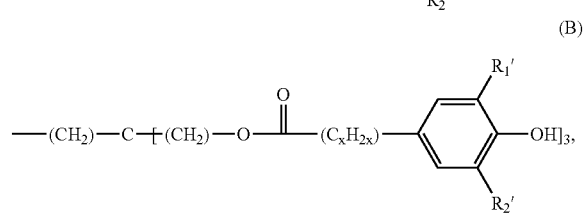

wherein
one of $R_1'$ and $R_2'$ independently of one another represents hydrogen or $C_1$-$C_4$alkyl and the other one represents $C_3$-$C_4$alkyl;
x represents zero (direct bond) or a numeral from one to three; and
y represents a numeral from two to six;
b) polyvinyl alcohol having a degree of polymerisation of about 500-2500 and a degree of hydrolysis of about 70.0-99.9%; and, optionally, further additives; and
c) water.

2. An aqueous emulsion according to claim 1 comprising
a) 1.0-80.0% (by weight) of a compound of the formula (I);
b) 0.1-10.0% polyvinyl alcohol having a degree of polymerisation of about 500-2500 and a degree of hydrolysis of about 70.0-99.9%; and, optionally, further additives; and
c) water as the remainder to make 100.0% by weight.

3. An aqueous emulsion according to claim 1 comprising
a) octadecyl-3-(3,5-di-tert-butyl-4-hydroxyphenyl)-propionate;
b) polyvinyl alcohol having a degree of polymerisation of about 500-2500 and a degree of hydrolysis of about 79.0-94.0%; and, optionally, further additives; and
c) water as the remainder to make 100.0% by weight.

4. An aqueous emulsion according to claim 3 comprising
a) 10.0-60.0% (by weight) octadecyl-3-(3,5-di-tert-butyl-4-hydroxyphenyl)-propionate;

b) 0.1-10.0% polyvinyl alcohol having a degree of polymerisation of about 500-2500 and a degree of hydrolysis of about 79.0-94.0%; and, optionally, further additives; and
c) water as the remainder to make 100.0% by weight.

5. An aqueous emulsion according to claim 3 comprising
a) 40.0-50.0% (by weight) octadecyl-3-(3,5-di-tert-butyl-4-hydroxyphenyl)propionate;
b) 1.0-5.0% polyvinyl alcohol having a degree of polymerisation of about 500-2 500 and a degree of hydrolysis of about 79.0-94.0%; and, optionally, further additives; and
c) water as the remainder to make 100.0% by weight.

\* \* \* \* \*